United States Patent [19]
Costas

[11] Patent Number: 5,652,594
[45] Date of Patent: Jul. 29, 1997

[54] SIGNAL PROCESSOR AFFORDING IMPROVED IMMUNITY TO MEDIUM ANOMALIES AND INTERFERENCE IN REMOTE OBJECT DETECTION SYSTEM

[75] Inventor: John P. Costas, Fayetteville, N.Y.

[73] Assignee: Lockheed Martin Corporation, Syracuse, N.Y.

[21] Appl. No.: 694,159

[22] Filed: Dec. 28, 1967

[51] Int. Cl.$^6$ ............... G01S 7/34; G01S 13/50
[52] U.S. Cl. ............... 342/162; 342/195; 342/93; 342/92; 342/115; 342/135
[58] Field of Search ............... 343/17.2, 100.7; 340/3, 3 M, 3 FM; 342/90, 91, 92, 93, 98, 115, 135, 162, 195

[56] References Cited

U.S. PATENT DOCUMENTS

| | | | |
|---|---|---|---|
| 3,167,738 | 1/1965 | Westerfield | 340/3 |
| 3,212,053 | 10/1965 | Finney | 340/3 |
| 3,386,077 | 5/1968 | Molho | 395/185.02 |
| 3,392,386 | 7/1968 | Evans et al. | 342/92 |
| 3,403,396 | 9/1968 | Van Popta et al. | 342/96 |
| 3,449,710 | 6/1969 | Moss, Jr. | 367/98 |

*Primary Examiner*—John B. Sotomayor
*Attorney, Agent, or Firm*—Paul Checkovich; Stephen A. Young

[57] ABSTRACT

A signal processor is described for object detection systems such as radar and sonar systems in which wave energy is transmitted and received as a train of discrete pulses of frequencies stepped in predetermined sequence. The received signal processor comprises a plurality of processing channels of number corresponding to the number of sub-pulses in the transmitted pulse train, each channel including frequency selective means such that signal returns of frequencies corresponding to but one of the transmitted sub-pulses are processed by that channel. Means are provided for simultaneously sampling the signal levels in all channels and indicating that channel in which the signal level is greatest, this sampling process being serially repeated at times related to each of the times of transmission of one sub-pulse of the train. The time sequence thus generated of the greatest amplitude signals in the several processor channels is compared or tallied against the sequence in which the sub-pulses of corresponding frequencies were originally transmitted, the occurrence of a match being taken as indicating a target at the range for which the sampling times were set.

5 Claims, 2 Drawing Sheets

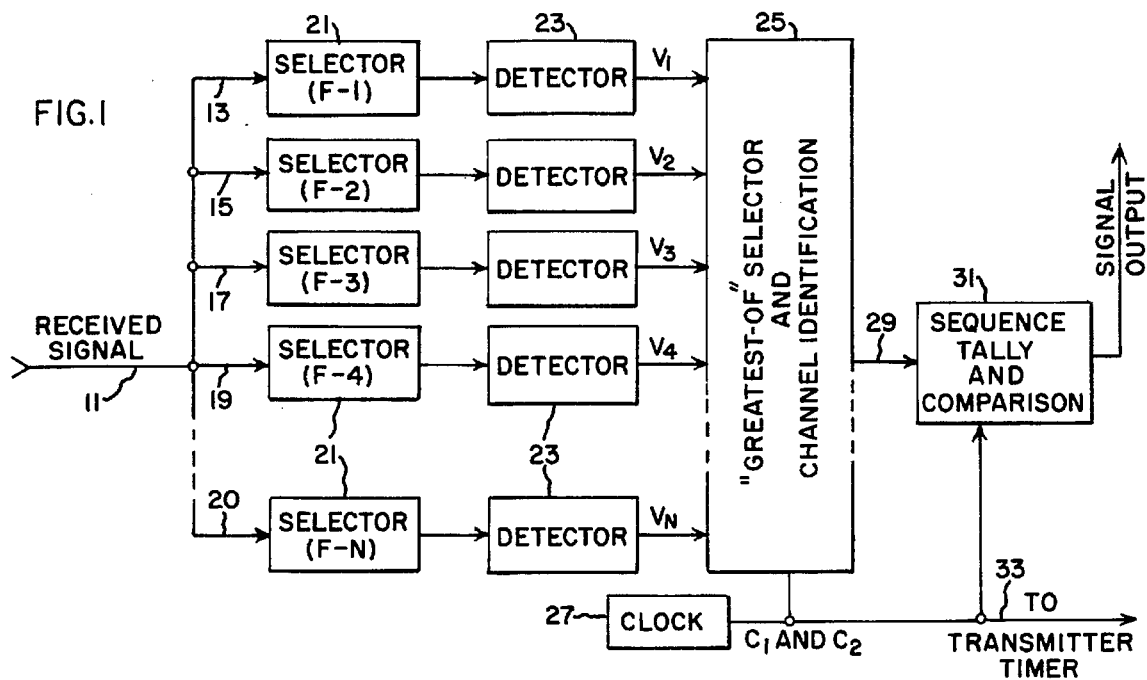
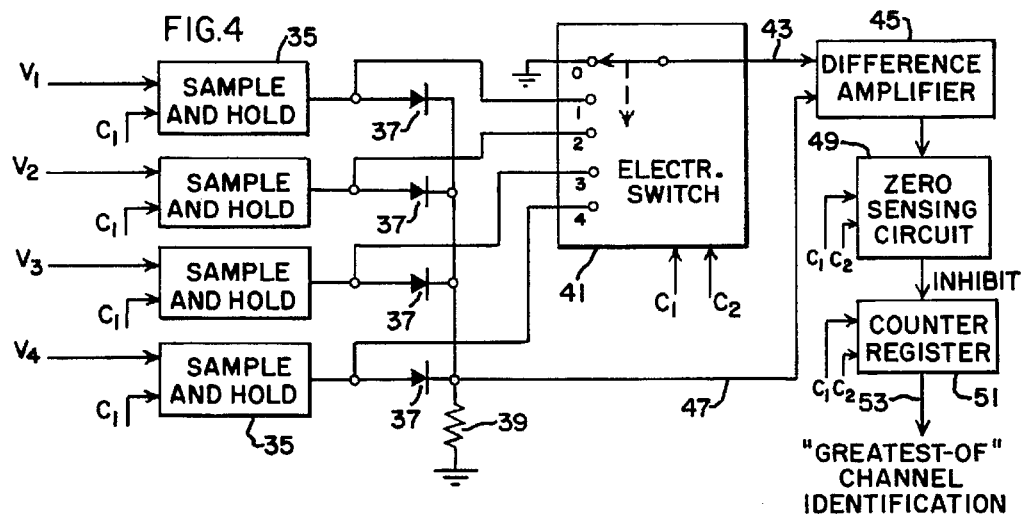
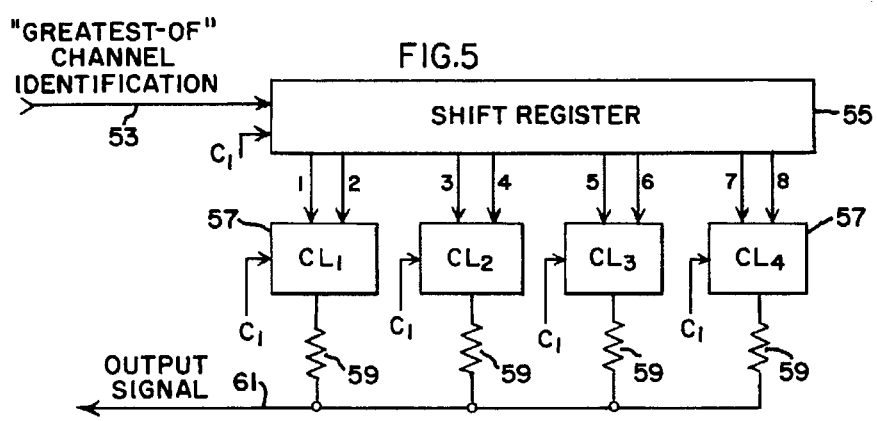

SIGNAL PROCESSOR AFFORDING IMPROVED IMMUNITY TO MEDIUM ANOMALIES AND INTERFERENCE IN REMOTE OBJECT DETECTION SYSTEM

FIELD OF THE INVENTION

This invention relates generally to sonar, radar and like remote object detection systems of the kind including a wave energy transmitter for illuminating the field containing the object and a receiver for sensing echo returns of transmitted energy as reflected from the object, to thus detect its presence, position or movement. More particularly, this invention relates to signal processors for use in such object detection systems for optimizing system performance against the deleterious effects of medium anomalies, noise and other interference. The signal processors of the invention embody target signal detection and extraction technique permitting significantly reduced probability of false alarm ($P_{fa}$) without significant adverse effect on probability of detection ($P_d$), and are particularly advantageous though not limited to use in systems employing transmitted pulse trains of special structure matched to the medium.

While the signal processors of this invention may be applied to radar and offer significant improvement in sub-clutter visibility when so applied, they afford special advantage in sonar systems due to the frequently more troublesome medium anomalies and interference encountered in the sonar application. The invention accordingly will be described hereinafter in a preferred embodiment in an active sonar system.

BRIEF DESCRIPTION OF THE PRIOR ART

One of the more troublesome problems encountered in active sonar systems is that of reverberation, which in typical long range sonar detection applications reaches very high levels shortly after transmit time and then decays in level, though not necessarily in monotonic fashion. Returns of targets of normal interest may occur at various times during the interpulse period, and since the reverberation level then is varying this means that the signal-to-interference ratio (SIR) may vary widely with time. The SIR also tends to vary with target doppler, since high velocity targets tend to suffer less reverberation interference due to the frequency difference separating the reverberation energy and target energy. The background or interference power level thus is subject to substantial variation in both time and frequency.

As a result, the classical analytical evaluation techniques based on calculated probability of false alarm ($P_{fa}$) and probability of detection ($P_d$) may yield misleading results in sonar applications. Calculation of $P_d$–$P_{fa}$ may yield results of practical significance when the background has constant variance, but for many sonar situations $P_d$–$P_a$ predictions may correlate poorly if at all with operational results actually experienced.

The seriousness of the problem of changing variance of interference is generally appreciated and many attempts have been made to minimize the adverse effects which result. Clipper-correlaters, AGC systems, logarithmic amplifiers, constant false alarm rate (CFAR) devices and many other signal extraction techniques and devices have been tried with varying degrees of success. Quite often the use of such refinements may succeed in normalizing the interference background but serious losses in $P_d$ will be found to have been the price paid for the constant $P_{fa}$. In fact, under field conditions it is not infrequently found that even the very complex and expensive signal processor chains will sometimes yield a level of performance no better than that provided by an operator viewing the unprocessed input signal directly.

BRIEF SUMMARY OF THE INVENTION

The present invention has as its principal objective the provision of signal processors which afford optimized target detection capabilities even in the presence of high and changing levels of noise and other interference, and which achieve these capabilities through a combination of analog and digital signal processing techniques enabling implementation with minimum complexity and cost. Additionally, the processors of this invention afford the advantages that:

(a) they provide analog to digital conversion enabling long time storage of signals digitally and eliminating delay lines and other potentially troublesome analog processor components;

(b) the signal-to-interference ratio (SIR) rather than the actual input levels of signal and interference are controlling of system output, and AGC requirements are materially relaxed because equal gain rather than constant level is required through the analog portions of the system;

(c) the false alarm rate is substantially constant, which is a particular advantage where computer-aided detection is to be used;

(d) the dynamic range of the processor output is substantially constant irrespective of receiver input level variations, thus simplifying display problems.

The foregoing and other objects, features and advantages may be achieved in sonar and other object detection systems in accordance with the invention, by a signal processing technique involving a time and frequency matching of received pulse sequences for identity to the transmitted pulse sequence. This technique has application to object detection systems of the kind wherein the transmitted signal consists of a train of sub-pulses of different frequencies ordered in predetermined sequence, and entails a "greatest-of" sampling of received signals at a plurality of frequencies each corresponding to one of those transmitted, the order of the "greatest-of" signals thus selected being tallied and matched against the order in which signals of the corresponding frequencies were transmitted. When the sequences match this constitutes a target indication.

A representative implementation of signal processor in accordance with the invention includes means responsive to the frequencies of the received signals for routing each of them through the appropriate one of a plurality of signal processor channels, of total number at least equal to the number of sub-pulses in the transmitted pulse train. "Greatest-of" and channel identification means are provided for simultaneously sampling the signal levels in all the processor channels at points in time related to the times of transmission of each sub-pulse, accomplishing a "greatest-of" selection from the sampled signal levels, and identifying the channel in which existed the highest signal level at the time of each sampling. The "greatest-of" and channel identification signals thus generated are ordered in a time sequence which then is tallied or compared against the sequence in which the sub-pulses of corresponding frequency were originally transmitted, and if the sequences match this indicates the presence of a target. Processing in this manner enables detection of targets at ranges determined by the time relationship between the sampling times and the times of transmission of the pulses of each train, and of targets at doppler values determined by the relationship between the center frequencies of the signal processor channels and the frequencies of the transmitted pulses; for targets at other ranges and of other doppler values time multiplexing and additional doppler channels may be provided as necessary to obtain desired range and doppler coverage.

BRIEF DESCRIPTION OF THE DRAWINGS

The invention will be further understood and its various objects, features and advantages more fully appreciated by reference to the following detailed description when read in conjunction with the accompanying drawings, wherein:

FIG. 1 is a block diagram of a signal processor in accordance with the invention as applied to a sonar system;

FIG. 4 is a logic diagram of a "greatest-of" detector and channel identification means suitable for use in the signal processor of FIG. 1; and FIG. 5 is a logic diagram of sequence tally and comparator means suitable for use in the signal processor of FIG. 1.

DESCRIPTION OF THE PREFERRED EMBODIMENT

Figure 2:
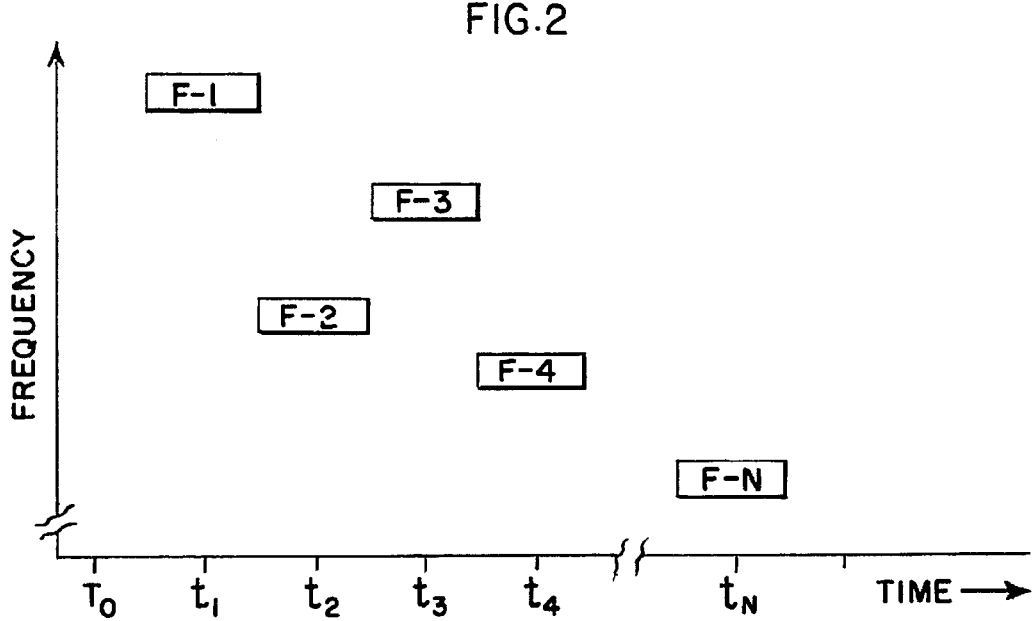
FIG. 2 illustrates a medium matched pulse train common to sonar systems of the type in which the signal processor of this invention finds application.

In active sonar systems the operating environment introduces a number of undesirable effects among which are (1) noise, including background noise and internal circuit noise, (2) reverberation, varying with both time and frequency, and (3) spreading of signal energy with both time and frequency. It is known that in order to optimize system performance under these conditions the basic pulse to be used should be "medium-matched", i.e., the range resolution of the basic pulse should be chosen to correspond to the range uncertainty imposed by the medium, and the frequency or doppler resolution of the basic pulse chosen to correspond to the frequency or doppler uncertainty imposed by the medium. In practice a pulse structure which has been found to be well matched and to yield good target detection performance in sonar applications in which the environmental problems previously enumerated are particularly troublesome, comprises a train of discrete sub-pulses arranged in a particular sequence in frequency and time as shown in FIG. 2, in which the individual sub-pulses are designated F-1, F-2 ... F-N. An N-pulse system is shown, with each sub-pulse occupying a unique position in the time and frequency domains. Thus, only one sub-pulse is radiated at any given time and the frequency band occupied by each sub-pulse is separate from those occupied by all other sub-pulses.

This pulse structure may be shown to be optimized with regard to both reverberation performance and noise performance for peak-power-limited transmitters, and accordingly is finding wide application. As conventionally implemented, sonars employing this pulse structure comprise a plurality of signal processing channels each of which selects one sub-pulse and delays it through a time interval inversely proportioned in magnitude in accordance with position of that sub-pulse in the pulse train, to thus bring all the detected sub-pulse signals into time alignment permitting direct addition thereof to produce a resultant sum voltage constituting the target signal output.

As previously explained, signal processors in accordance with the present invention are adapted to use with pulse structures like that shown in FIG. 2, and will yield significant improvement in target detection capability and other performance characteristics over prior systems utilizing this pulse structure in the manner just described. As shown in FIG. 1, the received signal on line 11 is applied to the input of a number of paralleled signal processing channels 13, 15, 17, 19 and 20, and to other similar channels not shown but of number such that the total is at least equal to the number N of sub-pulses which together constitute the transmitted pulse train as illustrated in FIG. 2.

Each such processor channel comprises frequency selective means 21 and a detector 23. The frequency selective elements 21 may conveniently comprise narrow band filters having their pass bands centered on frequencies each of which corresponds to but is displaced from one of the sub-pulses F-1, F-2 ... F-N of the transmitted pulse train by a frequency difference of magnitude appropriate to a particular target doppler. It will be appreciated that for targets of other doppler values additional signal processors like that of FIG. 1 but with the pass bands of its frequency selective elements 21 shifted correspondingly, will need be paralleled with it.

The processor as illustrated in FIG. 1 accepts its input signal at a receiver intermediate frequency (IF) and the detectors 23 accordingly are included to provide video signal output from each of the processor channels into the "greatest-of" detector and channel identification circuit 25. It might be noted here that signal processing at IF is not essential; if preferred the filters or other frequency selective elements 21 could be arranged to accomplish their channel routing function at the transmitted frequency.

Figure 3:
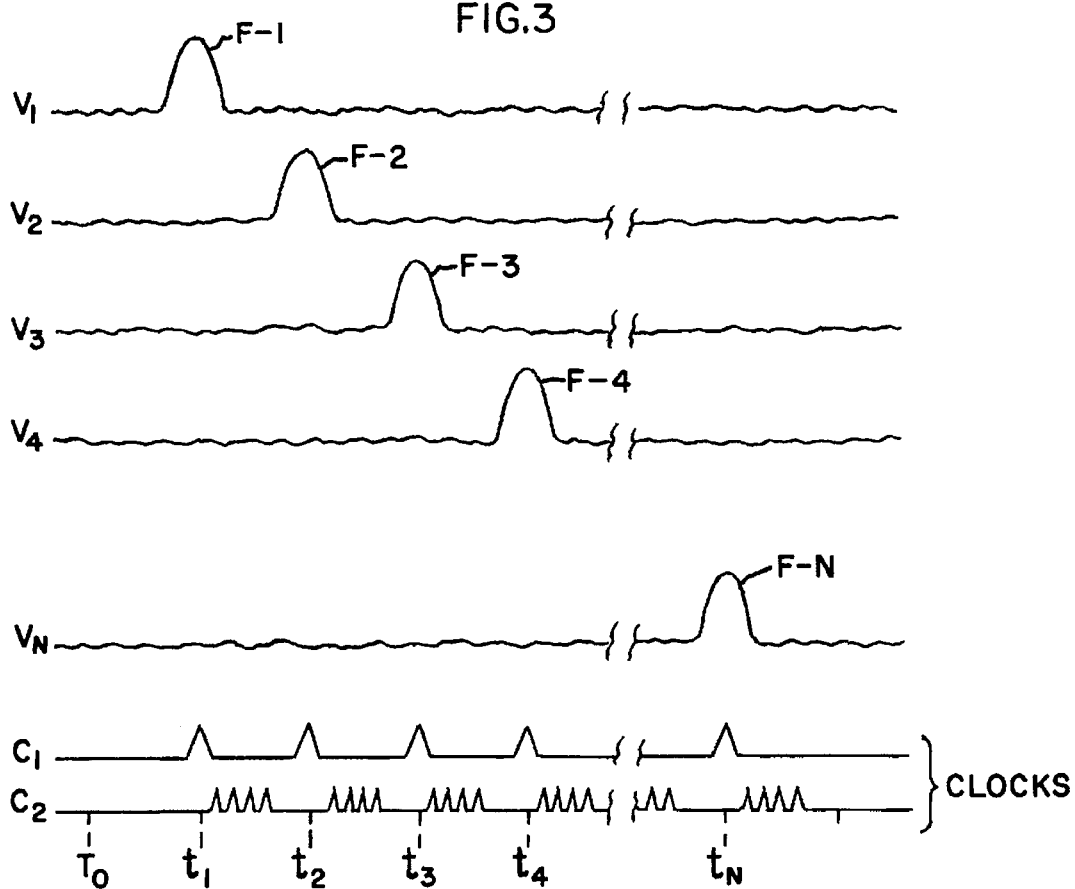
FIG. 3 illustrates waveforms occurring in the processor of FIG. 1 at the points indicated therein, and illustrates the time relationship between these waveforms and clock pulses controlling operation of the processor.

The signals from processor channels 13-20 at their point of common input to the "greatest-of" selector and channel identification circuit 25 are of the waveforms shown in FIG. 3, wherein each of the waveforms $V_1$, $V_2$ ... $V_n$ is numbered correspondingly to the numbering in FIG. 1. It will be observed that the peaks in these waveforms are correlated in time with the transmitted pulses F-1, F-2 and so on, and are marked accordingly. The waveform peaks are of course not simultaneous in time with the corresponding transmitted pulse, but all are displaced in time to a like extent dependent upon the range of the target from which the received signals were returned.

The "greatest of" selector and channel identification circuit 25 accepts these $V_1$-$V_n$ waveforms as analog signal inputs and produces a digital signal output indicating which of the several processor channels has the highest signal level at each of a series of sampling times each correlated to the time of transmission of one sub-pulse of the transmitted pulse train. For accomplishing this necessary correlation in time, a clock 27 provides timing pulses $c_1$ and $c_2$ as shown in FIG. 3 to synchronize the operations of the signal processor to the transmitted pulse timing in the manner further explained hereinafter.

From FIGS. 1 and 3 it will be apparent that waveform sampling and "greatest-of" selection at time $t_1$ will reveal the $V_1$ waveform in channel 13 to be high; sampling and "greatest-of" selection at time $t_2$ will reveal $V_2$ to be high, and so on through waveform $V_n$ which is found to be high at time $t_n$. For utilization of the results of this sampling and "greatest-of" signal selection, it is necessary to output the identity of the channel in which occurred the signal thus selected. The channel identification function of circuit 25 serves this purpose, by provision of a digital output signal sequence on line 29 indicating the "greatest-of" channel sequence. In the illustrated embodiment this output sequence will contain the integers from 1 to N in straight numerical order, that is, 1, 2, 3, 4 ... N, these integers being read out on line 29 at times $t_1, t_2, t_3, \ldots t_n$, and transmitted to the sequence tally and comparator 31.

Clock 27 provides a time input also to the sequence tally and comparison unit 31, as shown. The timing signals thus introduced are effective to initiate a comparison of each of the integers in the "greatest-of" channel identification sequence against the corresponding integer in a reference sequence which is stored or otherwise programmed into the comparator 31. In the particular embodiment being described this reference sequence is pre-programmed and fixed, but if desired it could be made variable with time to facilitate use of pulse codes changing from pulse to pulse in either repetitive or random fashion. Such reprogramming would of course require correlation in time and frequency of the transmitted sub-pulses with operation of the "greatest-of" selector and sequence tally, and for this purpose the clock 27 also provides an input on line 33 to the transmitter timer.

Sequence comparator 31 matches the detected signal sequence against the transmitted sequence, and generates a target indication when a selected degree of agreement is found. Each target indication thus generated may constitute the output signal or, preferably, the results of several such sequence comparisons may be summed or integrated over a period of time corresponding to several pulse trains to produce the output signal. Similarly, as will be explained in greater detail hereinafter with reference to an exemplary implementation of the sequence tally and comparator unit, this unit may be set to generate a target indication even though one or more of the integers in the series may be found not to match, or to require matching of all the integers in the series.

As will also be further explained hereinafter, the "greatest-of" selection may be based on samplings either of instantaneous values of waveforms $V_1$ through $V_n$, or based on samplings of these values integrated over part or all of the pulse width. In either case, the sampling and tally process will need be serially repeated with time shifts corresponding to predetermined range increments, in order to detect targets at other ranges of interest. This is most conveniently accomplished by time multiplexing in any of a variety of ways familiar to those skilled in the art, or alternatively by setting the sampling rate sufficiently high to enable detection of targets at all ranges of interest. Similarly, the processor as shown in FIG. 1 constitutes but one doppler channel and if other doppler values are to be processed additional channels paralleled with that shown will be necessary.

With reference now to FIG. 4, an exemplary implementation of a "greatest-of" selector and channel identification circuit is shown similar to that in the system of FIG. 1, though in the interests of simplicity of illustration the total number of processor channels has been reduced to four in FIG. 4. The input waveforms $V_1$ through $V_4$ in FIG. 4 may be the same as from the selector-detectors 21-23 of FIG. 1, and each is applied to one of four sample-and-hold circuits 35. Each such circuit is operative to sample the input voltage in response to each clock pulse $c_1$ and to hold the sampled voltage at its output until the next following $c_1$ clock pulse, at which time the input voltage is again sampled and the new sample held. The sample-and-hold circuits 35 may be of conventional configuration, and as previously indicated are preferably arranged for sampling of instantaneous values of the input voltage waveform though if preferred sampling may be integrated over some part or all of the width of the received signal sub-pulse during which occurs the clock pulse.

The voltage outputs of the sample-and-hold circuits 35 are transmitted to the anodes of four diodes 37 having a common cathode connection to a resistor 39 and thence to ground. Since the voltages $V_1$ through $V_4$ all are greater than zero, the voltage $V_g$ at the point of common connection of the cathodes of diodes 37 will assume a value equal to the greatest of the voltages $V_1$ through $V_4$. This will result because the highest of these voltages will cause the diode 37 to which it is applied to become conducting, thus raising $V_g$ to essentially that value of voltage. The remaining diodes 37 then will be back biased and consequently cut off. It will be appreciated that by this process $V_g$ automatically assumes a voltage equal to the greatest of the sampled voltages, thus performing the desired "greatest-of" selection.

It next is necessary to identify the particular channel in which occurred the waveform found, in the manner just described, to be of greatest amplitude at the time of sampling. For this purpose there is provided an electronic stepping switch 41 which as shown is electrically of single pole, five throw configuration and which steps from its zero position through positions 1, 2, 3 and 4 in response to each input clock pulse $c_2$, then resets to zero position in response to each input clock pulse $c_1$. In this way the output of the electronic switch 41 on line 43 is made to contain, sequentially, the samplings of voltages $V_1$ through $V_4$ taken by the sample-and-hold circuits 35.

These sampled voltages on line 43 constitute a first input to a difference amplifier 45, the second input to which is the "greatest-of" voltage $V_g$, which is transmitted to the difference amplifier on line 47. Except at the moment at which the electronic switch 41 connects line 43 to the output of the particular sample-and-hold circuit 35 from which the $V_g$ signal was derived, there will exist a substantial difference between the two inputs to difference amplifier 45 and it consequently will produce a substantial voltage output. However, at the moment when switch 41 connects line 43 to the sample-and-hold circuit 35 which passed the "greatest-of" signal $V_g$, an approximate balance will exist and the output of the difference amplifier will fall substantially to zero.

The amplifier output signal is transmitted to a zero sensing circuit 49 to which the clock pulses $c_1$ and $c_2$ also constitute inputs. This zero sensing circuit is reset to zero output by each input $c_1$ clock pulse, and remains at zero output so long as its input from the difference amplifier 45 remains above a threshhold value which preferably is set slightly above zero. When the output of difference amplifier 45 drops approximately to zero, indicating that the electronic switch 41 has stepped through to the channel on which then occurs the "greatest-of" signal, the resulting drop in input voltage to the zero sensing circuit through its threshhold will cause that circuit to generate and transmit an output signal on the next following input $c_2$ clock pulse. Thus if, for example, $V_3$ is the greatest of $V_1$ through $V_4$ at time $t_3$, the output of difference amplifier 45 will drop to zero on the third $c_2$ clock pulse, and this will cause the zero sensing circuit 49 then to respond with an output signal in the form of an INHIBIT input to a counter register 51.

This counter register, which marks the conversion from analog signal processing in the preceding portion of the system to digital signal processing in the following portion, is a two stage binary counter which responds to each input $c_1$ clock pulse to read out, on its output line 53, whatever number then is standing in the register, and then immediately resets to its full count (11). That is, each $c_1$ pulse causes the counter register to read out the "greatest-of" channel identification signal which is constituted by the count then standing in the register, and it is then reloaded full. Thus loaded, the counter register responds to each following $c_2$ pulse to count one step, until further count is halted by the INHIBIT signal from zero sensing circuit 49. Upon reception of the INHIBIT signal from zero sensing circuit 49, counter register 51 holds its count then standing in the register until read out in response to the next following $c_1$ pulse.

Referring again to the case in which $V_3$ is the greatest of $V_1$ through $V_4$ at the particular sampling time ($t_3$) of interest, the counter register would accept three input $c_2$ pulses before being inhibited. The first such pulse would result in a clear to (00), the second pulse would store (01) and the third pulse would store (10). The fourth pulse of the $c_2$ series would not affect the counter register or be responded to by it, as the INHIBIT signal would have been received immediately after the third $c_2$ pulse. Therefore, when the next following $c_1$ pulse occurs the readout from the counter register is of the binary number (10). In this way the counter register reads out the binary values 00, 01, 10 or 11 for $V_1$ greatest, $V_2$ greatest, $V_3$ greatest and $V_4$ greatest, respectively.

The "greatest-of" channel identification signal generated in this way is transmitted on line 53 to shift register 55 as shown in FIG. 5. This register 55 comprises eight stages and is responsive to each input $c_1$ clock pulse to shift its contents two positions to the right. That is, once each $c_1$ clock pulse the two-bit binary signal output of the counter register 51 enters the shift register 55 at the left, the prior content of the register shifts two positions to the right, and the oldest data (two bits) on the right is lost.

The binary number standing in shift register 55 after the last of the $c_1$ pulses in each series, i.e., after the fourth $c_1$ pulse in this example, defines the order in which the "greatest-of" signal appears in the four signal processing channels, and thus constitutes a received signal sequence tally. This sequence tally is compared against the transmitted pulse sequence by means of four coincidence logic circuits 57, designated "$CL_1$" through "$CL_4$" in FIG. 5.

These coincidence logic circuits are two-bit units and each is preloaded with the bit pattern corresponding to its position in the transmit pulse frequency-time pattern. In response to the $c_1$ clock pulse inputs shown, each of the coincidence logic circuits compares the two-bit binary number transmitted to it from shift register 55 with the number with which it has been preloaded. If there is a match, an output voltage of some fixed magnitude, say four volts in this example, will be impressed across one of a network of identical summing resistors 59 through which the CL circuits transmit their outputs. If there is no match, then that coincidence logic circuit will deliver zero volts to its output summing resistor. Thus the output signal will range from zero volts in the event that none of the inputs from shift register 55 is in agreement with the numbers preloaded into the coincidence logic circuits 57, to four volts in the event that all four coincidence logic circuits indicate a match. The output signal remains on the output line 61 until the next $c_1$ pulse occurs, then the sequence just described is repeated. If desired the output may be integrated over a series of pulse trains or the results of each may be read out and utilized individually.

Signal processing in this manner will yield an output signal indicating the number of sub-pulses of each pulse train for which the transmitted and received signal sequences correspond. Depending upon the particular application, correspondence may be required for all N sub-pulses before the output is to be taken as a match indicating the presence of a target, or a match may require correspondence of some lesser number of sub-pulses as indicated by a voltage on the output line 61 lower than the maximum (four volts in this example) which results if all sub-pulses tally, but higher than the minimum (0 volts in this example) which results if there is no correspondence at all. To further enhance target detection capability under some conditions, there may be provided additional similar processors operative when no match is found between "greatest-of" signals to sample for and identify the second greatest signals, and to tally and compare their sequence against the reference sequence in the same manner as just described.

As will be obvious to those skilled in the art, the invention has been described in a relatively simple embodiment but lends itself well to use in more complex systems affording such additional features as doppler identification, detection-only outputs, and output storage for history recall. As will also be obvious, conversion from analog to digital signal processing is not essential and if preferred signal processing may be either all analog or all digital. Similarly, it will be appreciated that the basic function served by the plural processing channels together with the "greatest-of" selector and channel identification circuit is one of determining the frequency of the received signal sub-pulse of highest amplitude at the time of each "greatest-of" sampling and comparison, and that this same basic function may be performed in other ways by other devices. For example, a conventional spectrum analyzer of the kind providing as its output a measure of the frequency of the highest input waveform peak at the time of measurement, which would be correlated to the time of transmission of each sub-pulse in the same manner as previously described, could be substituted for the elements just enumerated.

While in this description of the invention only a presently preferred embodiment has been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. For use in an object detection system including transmitter means for illuminating the object with wave energy radiated as a train of sub-pulses each of frequency different from other adjacent sub-pulses in the train, a received signal processor comprising:

a) "greatest-of" selection and identification means operative to repetitively sample the received signal at times each related to the time of transmission of one sub-pulse and to produce a signal indicating the frequency of the received signal sub-pulse of greatest amplitude at the time of sampling;

(b) means for tallying the received signal sub-pulse identification signals thus generated and comparing their sequence against the transmitted sub-pulse frequency sequence; and (c) means for producing a target indication upon matching of the received and transmitted sub-pulse frequency sequences thus compared.

2. A received signal processor as defined in claim 1 wherein said "greatest-of" selection means comprises a plurality of signal processing channels, means responsive to received signal frequency for routing received sub-pulses through said channels selectively in accordance with their frequency, and means for identifying the channel in which exists the greatest amplitude signal at each of said sampling times.

3. A received signal processor as defined in claim 1 further including clock means providing time reference signals for synchronizing said sequence tally and comparison of received signal sub-pulse sequence against the transmitted sequence.

4. A received signal processor as defined in claim 1 further including analog-to-digital conversion means operative on said received and transmitted sub-pulse signals to enable tally and comparison thereof digitally.

5. For use in an object detection system including transmitter means for illuminating the object with wave energy transmitted as a train of pulses of different frequencies ordered in particular sequence and including receiver means for detecting echo returns of transmitted energy as reflected by the object, received signal processor means comprising:

(a) a plurality of signal processor channels of number corresponding to the number of pulses in the transmitted pulse train;

(b) means responsive to frequencies of said received signal pulses for routing each thereof into one of said signal processing channels;

(c) clock means for generating a series of time reference signals each at a point in time related to one of said transmitted pulses;

(d) "greatest-of" selection means responsive to each of said time reference signals to sample signal strengths in each of said signal processing channels and to generate a received pulse sequence signal indicating the order of the channels in which occur the "greatest-of" signals selected; and (e) sequence tally means for matching the received pulse sequence signal thus generated against the transmitted pulse sequence and for producing a target signal when the transmitted and received pulse frequency sequences correspond.

* * * * *